United States Patent [19]

Collins

[11] Patent Number: 4,612,609

[45] Date of Patent: Sep. 16, 1986

[54] LIGHT ASSEMBLY WITH REMOVABLE BULB

[75] Inventor: William J. Collins, Boulder, Colo.

[73] Assignee: The Coleman Company, Inc., Wichita, Kans.

[21] Appl. No.: 639,061

[22] Filed: Aug. 10, 1984

[51] Int. Cl.[4] .......... H01G 1/14

[52] U.S. Cl. .......... 362/306; 362/267

[58] Field of Search .......... 362/306, 267, 311, 296, 362/226, 269

[56] References Cited

U.S. PATENT DOCUMENTS

| | | | |
|---|---|---|---|
| Re. 19,211 | 6/1934 | Udell | 362/311 |
| 2,254,808 | 9/1941 | Bounty | 362/306 |
| 4,342,072 | 7/1982 | Guritz | 362/306 |
| 4,390,931 | 6/1983 | Gorick | 362/306 |
| 4,410,931 | 10/1983 | DeCandia | 362/306 |

FOREIGN PATENT DOCUMENTS

| | | | |
|---|---|---|---|
| 547400 | 10/1957 | Canada | 362/306 |
| 2818081 | 11/1978 | Fed. Rep. of Germany | 362/306 |
| 2429961 | 2/1980 | France | 362/306 |

*Primary Examiner*—Ronald H. Lazarus

[57] ABSTRACT

A light assembly includes a reflector and a bulb assembly which is removably mounted on the reflector by a retainer spring. The reflector includes a generally parabolic reflector wall, a cylindrical wall which extends rearwardly from the reflector wall, and a rear wall at the rear end of the cylindrical wall which extends generally perpendicularly to the axis of the reflector wall. The bulb assembly includes a bulb which extends through an opening in the rear wall of the reflector and a flange which is retained against the rear wall by a retainer spring which is removably attached to the reflector. The front end of the reflector includes a generally annular rim, and a transparent lens is retained within the rim and against an O-ring within the rim by a retainer ring which surrounds the rim.

9 Claims, 13 Drawing Figures

LIGHT ASSEMBLY WITH REMOVABLE BULB

BACKGROUND AND SUMMARY

This invention relates to a light assembly, and, more particularly, to a light assembly which includes a removable bulb assembly and a sealed lens assembly.

Lights for motorcycles, automobile spotlights, and the like generally include a housing and a light assembly which is removably mounted within the housing. The light assembly is conventionally a sealed beam assembly which must be replaced when the light burns out. Other light assemblies include a reflector and a replaceable light bulb. When the bulb burns out, the light assembly is removed from the housing and only the bulb is replaced.

A replaceable bulb must be removably mounted in the reflector for easy replacement, but the bulb must make good electrical contact with the reflector to complete the electrical circuit. A light assembly with a replaceable bulb generally include a two-piece reflector assembly which includes a generally parabolic reflector and a bulb-mounting insert which is mounted in an opening in the reflector and which holds the bulb.

The light assembly may also include a lens which is mounted on the front of the reflector. It is desirable that the lens be held securely on the reflector to prevent rattling and to provide a seal against dirt and moisture.

The invention provides a one-piece reflector which has a cup-shaped rearward extension. The cup-shaped extension terminates in a flat rear wall which is provided with a bulb opening. The bulb of a conventional bulb assembly is inserted through the bulb opening, and the flange of the bulb assembly is held against the rear wall by a retainer spring which is removably attached to the rear wall. The flange is maintained in electrical contact with the rear wall by the spring, and the bulb can be replaced merely by removing the spring. The front of the reflector terminates in an annular rim, and an O-ring and a lens are retained within the rim by a retainer ring which surrounds the rim. The retainer ring forces the lens against the O-ring to seat the lens and to provide a seal. The retainer ring is formed from a pair of plastic halves which are sonic welded together around the rim.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
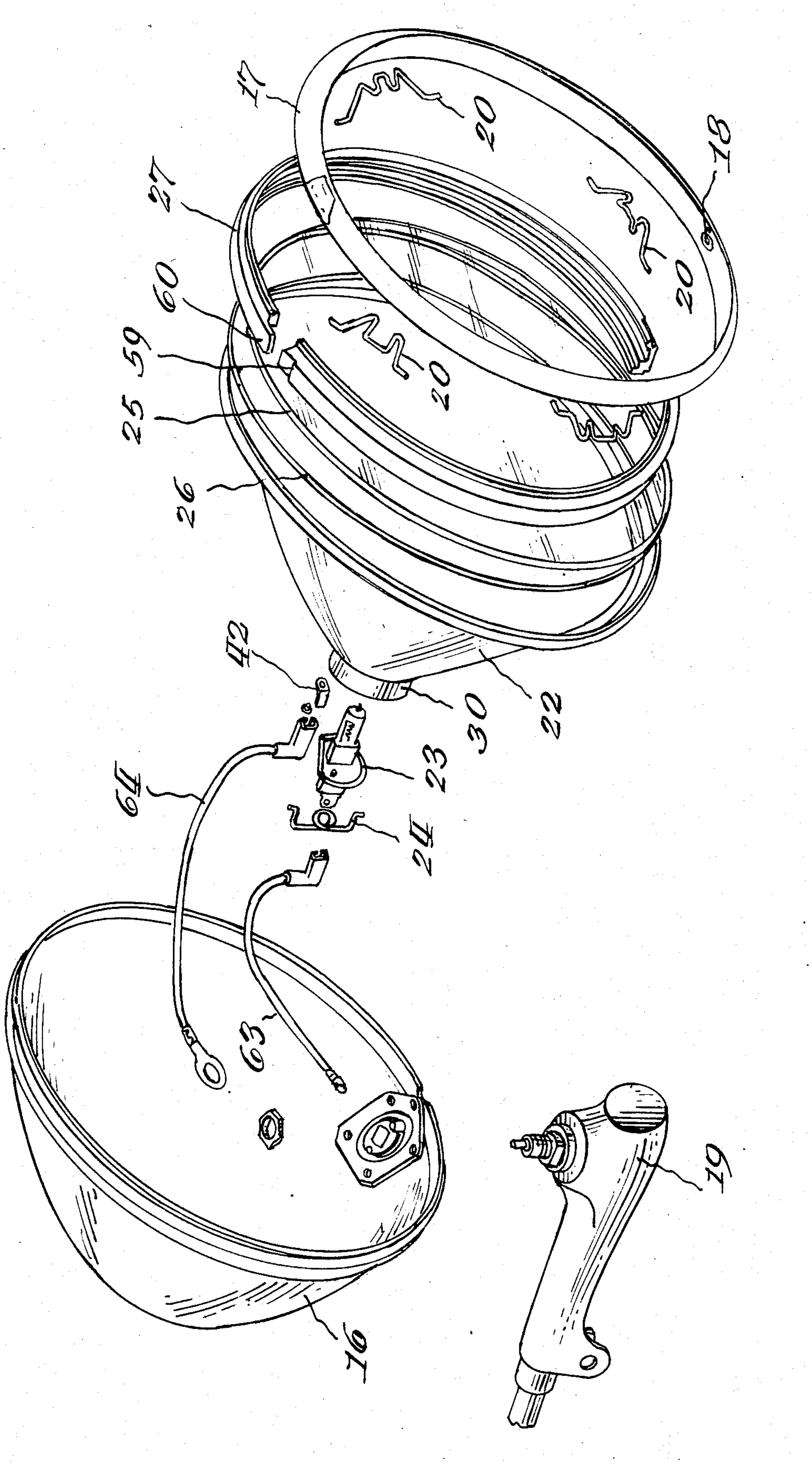
FIG. 1 is an exploded perspective view of a light assembly formed in accordance with the invention and a conventional light housing.
Figure 2:
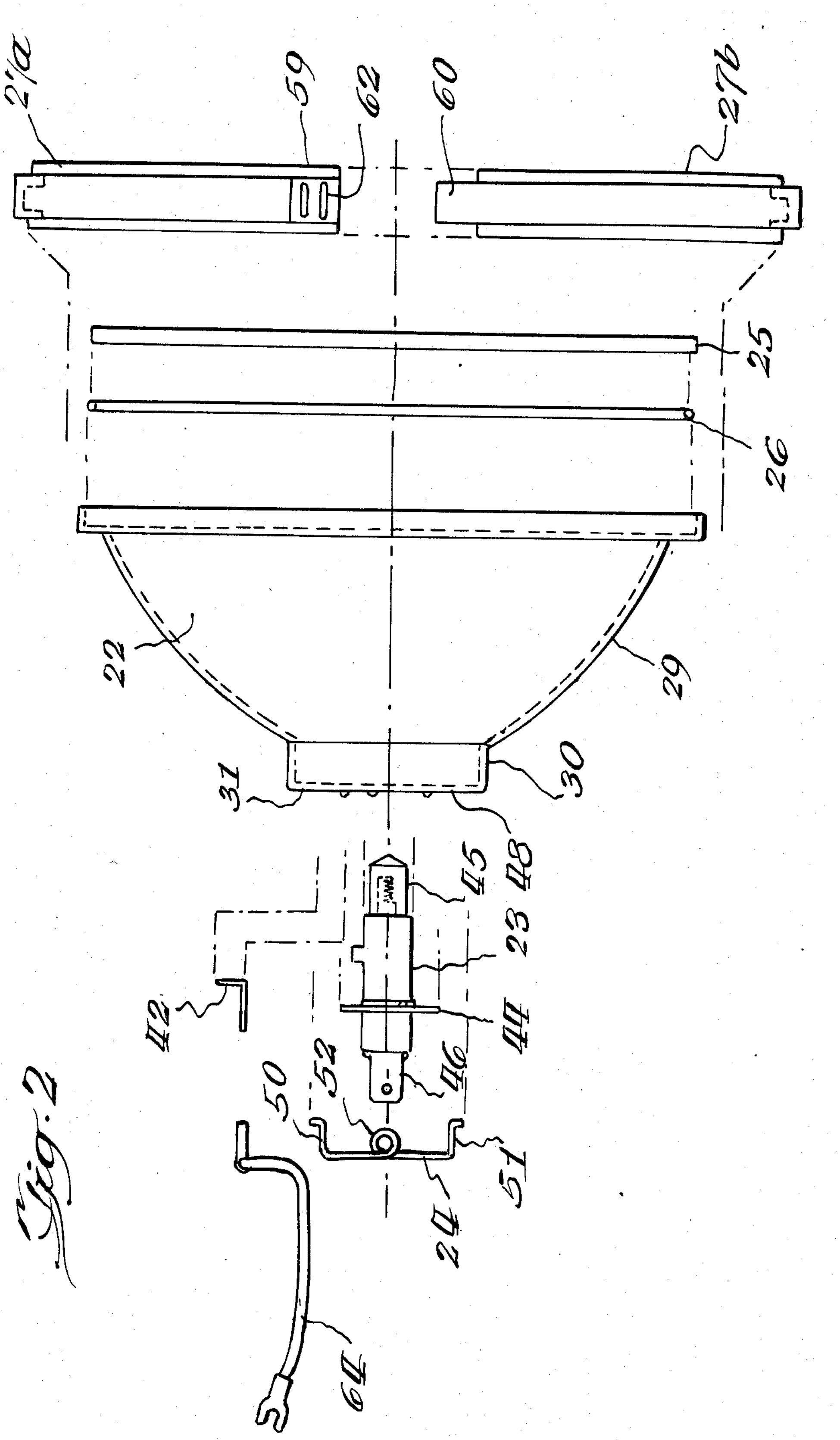
FIG. 2 is an exploded side view of the light assembly.
Figure 3:
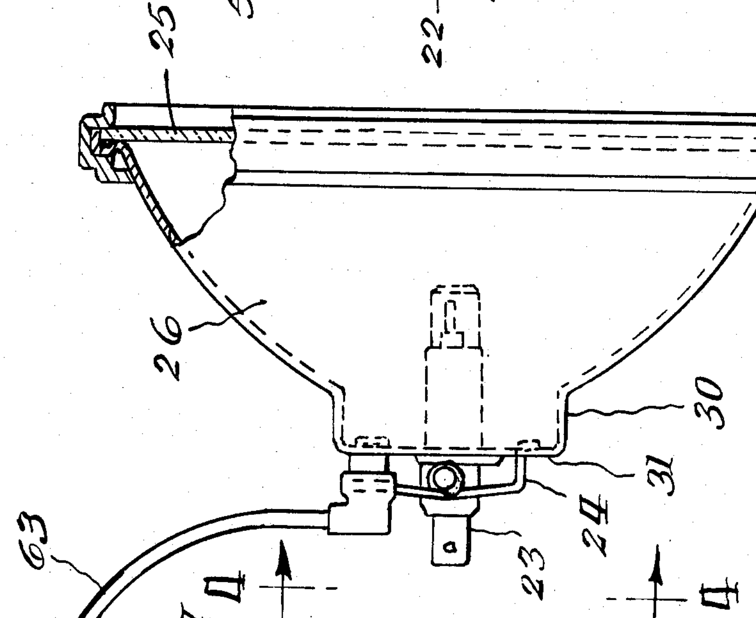
FIG. 3 is a side view, partially broken away, of the assembled light assembly.
Figure 4:
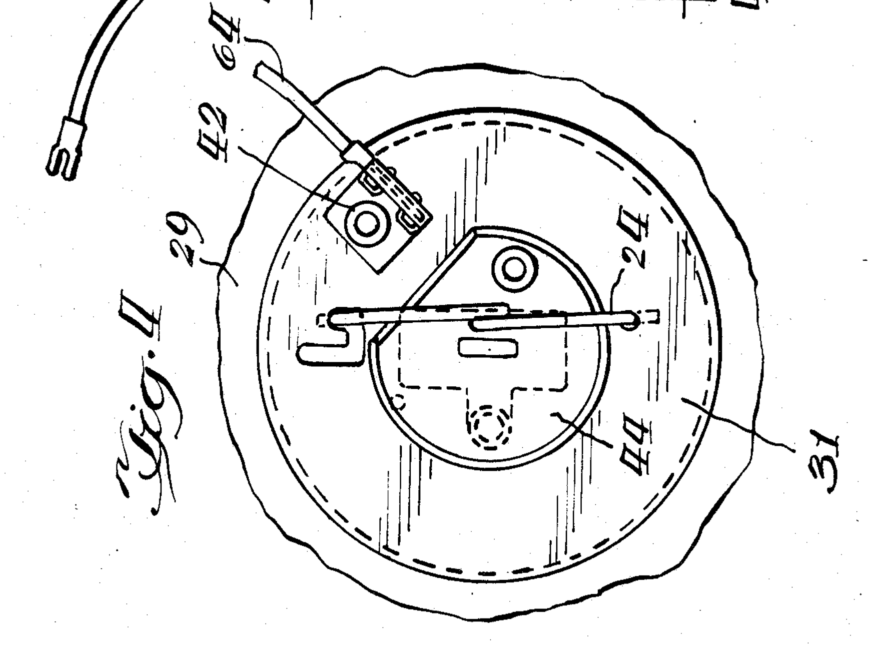
FIG. 4 is an enlarged fragmentary rear view of the light assembly taken along the line 4—4 of FIG. 3.

A light assembly 15 shown in FIG. 3 is adapted to be mounted within a conventional light housing 16 shown in FIG. 1. The light assembly 15 is retained within the housing 16 by a bezel ring 17 which is secured to the housing by a screw which is inserted into a screw hole 18 in the ring. The particular light housing 16 illustrated in the drawing is part of a spotlight and is mounted on a support arm 19. The support arm can be mounted on, for example, an automobile.

The light assembly 15 is adapted to be inserted into and removed from the light housing 16 as a unit. The light assembly is mounted within the bezel ring 17 by conventional spring mounting clips 20.

Referring to FIGS. 1-5, the light assembly 15 includes a reflector 22, a conventional light bulb assembly 23 which is mounted on the rear of the reflector, a spring retainer clip 24, a transparent lens 25 which is mounted on the front of the reflector, an O-ring 26, and a lens retainer ring 27.

Figure 7:
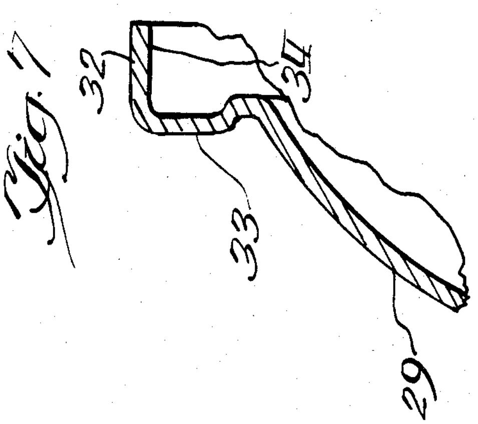
FIG. 7 is an enlarged fragmentary sectional view of the rim of the reflector.

The reflector 22 is advantageously formed by deep drawing a sheet of aluminum and includes a generally parabolic reflector wall 29, a rearwardly extending cylindrical wall 30, and a flat rear wall 31. The front of the reflector terminates in a generally annular rim 32 (see particularly FIG. 7) which is provided by a radially outwardly extending annular wall 33 and a forwardly extending cylindrical wall 34.

Figure 8:
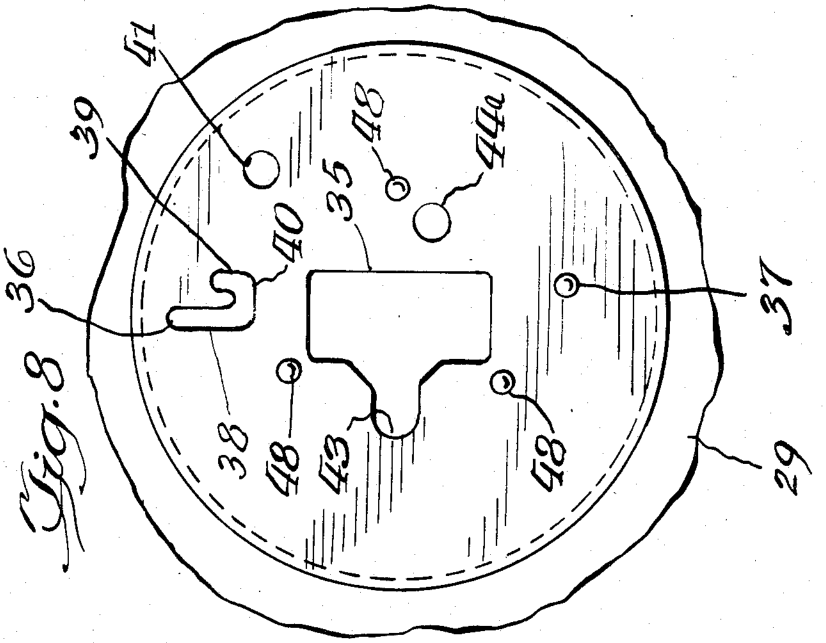
FIG. 8 is an enlarged fragmentary view of the rear of the reflector taken along the line 8—8 of FIG. 6.

The axis of the cylindrical wall 30 is aligned with the axis of the reflector wall 29, and the flat rear wall 31 extends perpendicularly to the axes. A generally rectangular bulb opening 35 (FIG. 8) is provided in the center of the rear wall, and a pair of openings 36 and 37 are provided in the rear wall for the retainer clip 24. The opening 36 is generally U-shaped and includes a long leg 38, a short leg 39, and a central portion 40. Another opening 41 is provided in the rear wall for attaching an electrical terminal 42 (FIG. 4) to the reflector. An extension 43 in the opening 35 and an opening **44*a* are provided for the locating lugs of the bulb assembly 23**.

The bulb assembly 23 is conventional, and the particular bulb assembly shown in the drawing is designated as an H-l bulb, which is a 12 volt 100 watt quartz hologen bulb. The bulb assembly includes a flat metal flange 44 (FIG. 2), a bulb 45, and an electrical terminal 46.

Figure 6:
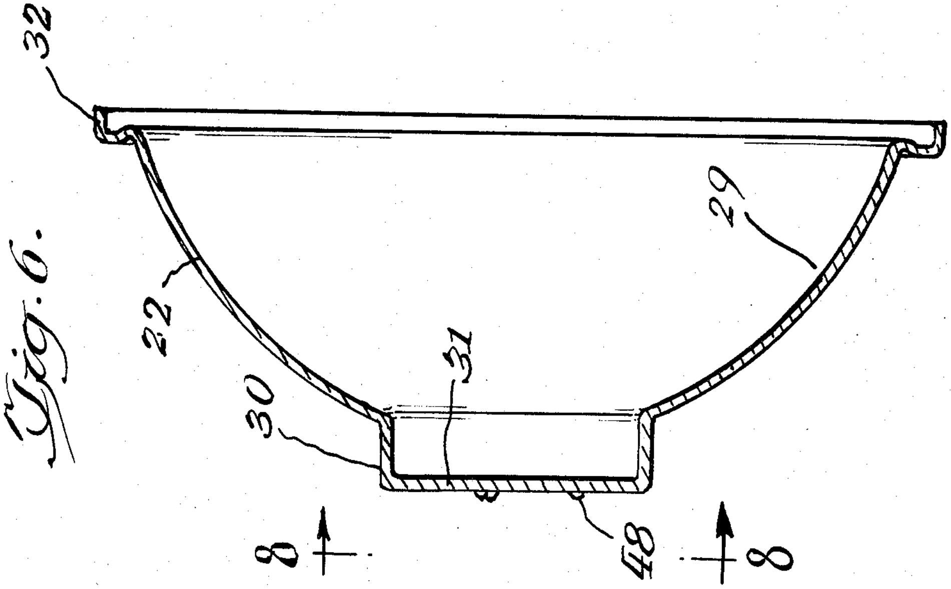
FIG. 6 is a sectional view of the reflector of the light assembly.

The bulb opening 35 in the rear wall 31 of the reflector is shaped to permit the bulb 45 to be inserted through the opening, and the flange 44 is held against the rear wall by the spring retainer clip 24. The rear wall 31 is advantageously provided with three rearwardly extending dimples or projections 48 (FIGS. 6 and 8) which contact the flange 44 and which ensure good electrical contact between the rear wall and the flange.

The spring retainer clip 24 is formed from spring wire and includes a pair of L-shaped end portions 50 and 51 and a looped central portion 52. When the clip is unstressed, the distance between the ends of the clip is greater than the distance between the openings 36 and 37 in the rear wall 31. One of the end portions of the clip is inserted into the opening 37 in the rear wall 31, and the other end of the clip is then compressed and inserted into the long leg 38 of the U-shaped opening 36. The clip is then moved to the short leg 39 of the U-shaped opening where it is retained by the force exerted by the compressed spring. The looped central portion 52 of the clip contacts the flange 44 of the bulb assembly and forces it against the dimples on the rear wall 31.

Referring now to the front end of the reflector, the O-ring 26 is formed from compressible material such as silicone rubber and is sized to fit inside the outer wall 34 of the rim 32. The lens 25 is also sized to fit inside the outer wall 34. The retainer ring 27 is formed from two identical semicircular halves 27*a* and 27*b* (FIGS. 2 and 9) which are inserted over the rim 32 and secured together.

Figure 5:
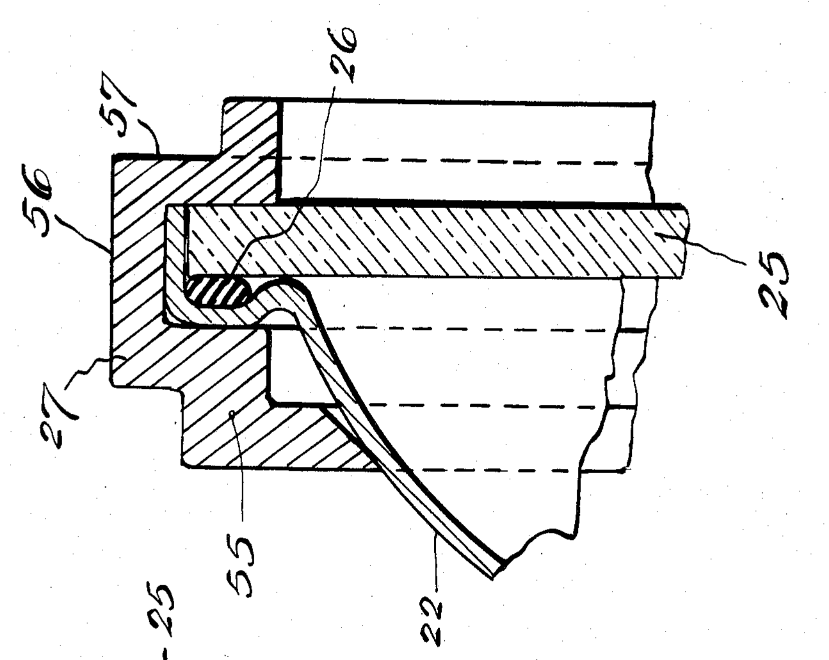
FIG. 5 is an enlarged fragmentary view of the upper portion of FIG. 3.

Referring to FIG. 5, each of the ring halves 27*a* and 27*b* include a radially extending rear wall 55 which engages the annular wall 33 of the rim, an axially extending outer wall 56 which engages the outer wall 34 of the rim, and a radially extending front wall 57 which engages the lens 25 and forces the lens against the O-ring. The O-ring is thereby compressed by the retainer ring 27 so that the lens is held firmly within the reflector and the inside of the reflector is sealed against dirt and moisture.

Figure 9:
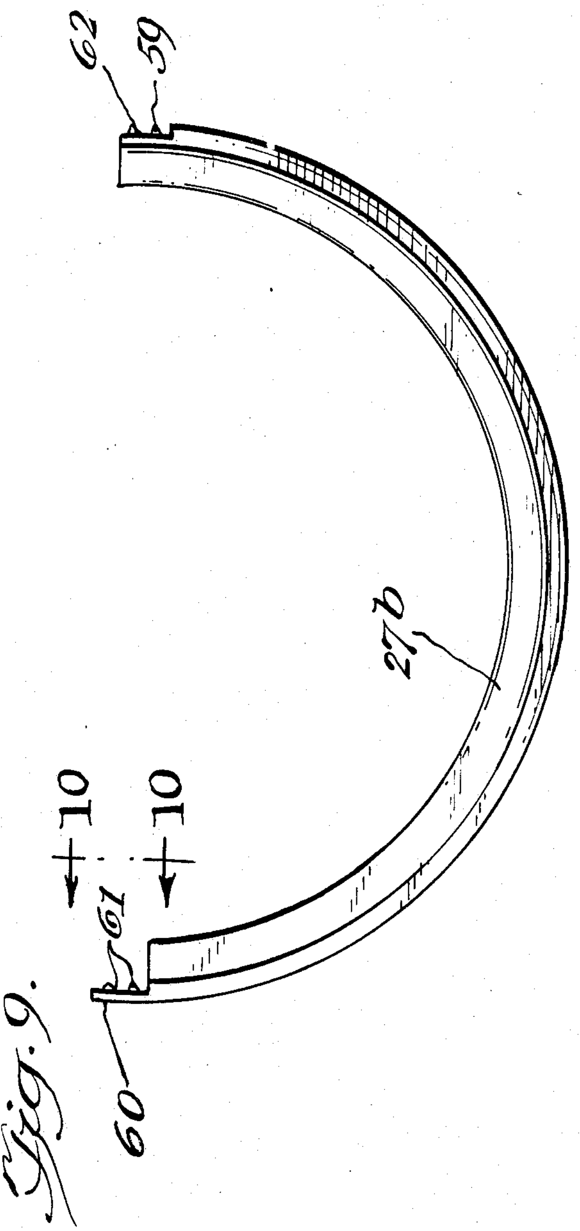
FIG. 9 is a front elevational view of one of the halves of the lens retainer ring taken along the line 9—9 of FIG. 2.
Figure 11:
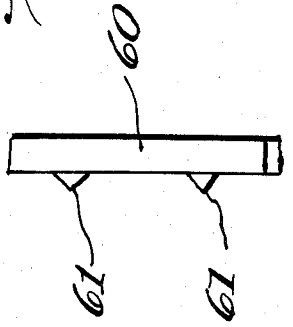
FIG. 11 is an enlarged fragmentary view of the retainer ring half taken along the line 11—11 of FIG. 10.
Figure 10:
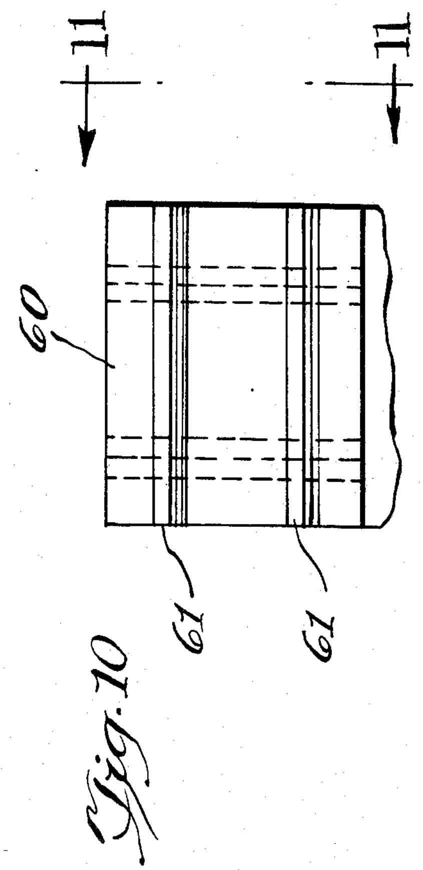
FIG. 10 is an enlarged fragmentary view of the end of the retainer ring half taken along the line 10—10 of FIG. 9.

After the two retainer ring halves 27*a* and 27*b* are inserted over the rim, the two halves are advantageously permanently secured together by sonic welding. The ring halves are formed from suitable plastic, such as black Celanex J 234, which is a heat-resistant glass-filled polyester. Referring to FIGS. 1, 9, and 10, each ring half has one end in which the outer wall 56 is recessed at 59 and one end in which the outer wall includes a tab extension 60 which is designed to mate with the recess 59 of the other ring half. The tab 60 includes two triangular ribs 61 (FIGS. 10 and 11) which act as energy directors for the sonic energy, and the recessed end includes two similar ribs 62 (FIG. 9).

Referring again to FIG. 1, the light includes a pair of electrical wires 63 and 64 which extend through the housing 16 and are connected to a suitable energy source, for example, the electrical system of an automobile. Each wire terminates in a conventional female bayonet terminal, and before the light assembly 16 is positioned within the housing 15, the wire 63 is connected to the male bayonet terminal 46 of the bulb assembly 23 and the wire 64 is connected to the male bayonet terminal 42 on the rear wall of the reflector.

When the bulb burns out or otherwise needs replacement, the bezel ring 17 is detached from the housing 16 and the light assembly 15 is removed. The bulb assembly can be removed merely by compressing the spring retainer clip 24 and withdrawing the end portion thereof from the long leg 38 of the U-shaped opening 37 in the rear wall of the reflector.

Figure 13:
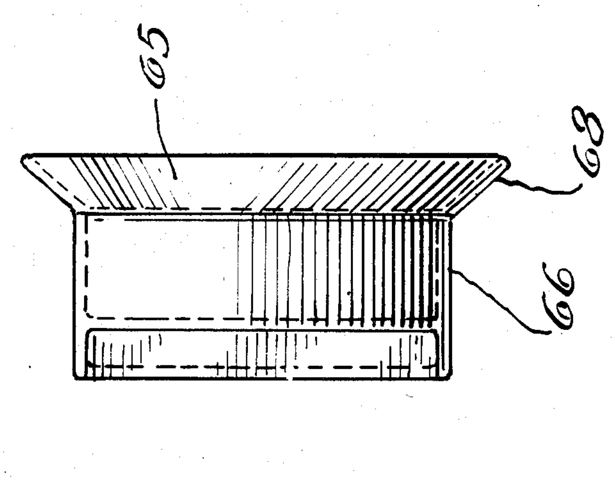
FIG. 13 is a side view of the weatherproof cap of FIG. 12.
Figure 12:
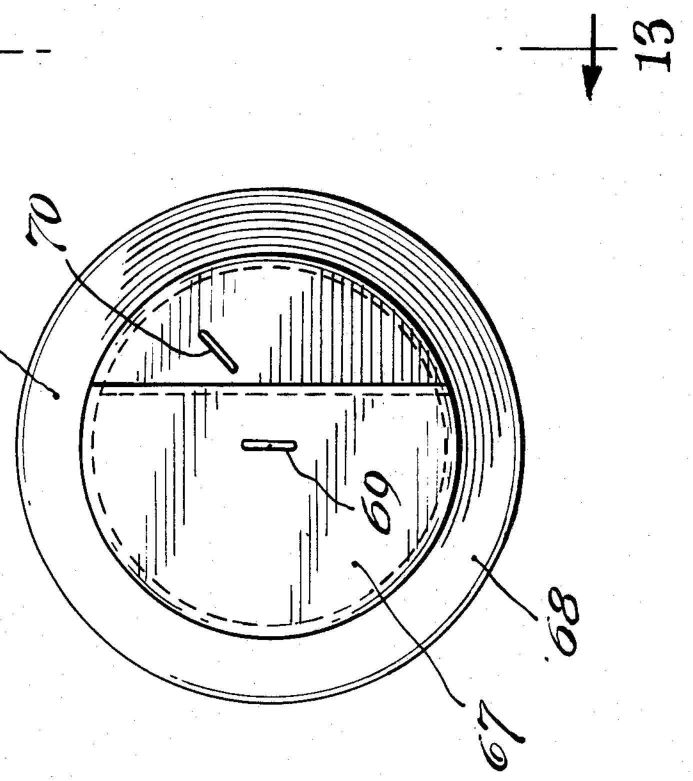
FIG. 12 is a rear view of a weatherproof cap for the light assembly.

An optional weatherproof rubber cap 65 for covering the rear end of the light assembly is shown in FIGS. 12 and 13. The cap is advantageously formed from rubber and includes a cylindrical side wall 66, a rear wall 67, and a flared forward wall 68. A pair of slots 69 and 70 are provided in the rear wall to accommodate the male bayonet terminals 46 and 42, respectively. Before the electrical wires 63 and 64 are connected to the terminals 46 and 42, the cap 65 can be inserted over the bulb assembly 23 and the cylindrical side wall 30 of the reflector. The inside diameter of the cylindrical side wall 66 is sized to be frictionally retained on the cylindrical side wall 30 of the reflector, and the flared front wall 68 of the cap contacts the parabolic reflecting wall of the reflector.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A light assembly comprising:

(a) an integral reflector having a generally parabolic reflecting wall with a front end including a generally cylindrical wall which extends rearwardly from the generally parabolic reflecting wall, and a rear end and a rear wall which extends generally perpendicularly to the axis of the reflecting wall, the rear wall having a bulb opening therein and a pair of spring retainer openings, (b) a bulb assembly comprising a light bulb and a generally flat flange attached to the light bulb, the light bulb extending through the bulb opening in the rear wall of the reflector and the flange engaging the rear wall of the reflector, and (c) a retainer spring mounted on the reflector and holding the flange of the bulb assembly against the rear wall of the reflector, the retainer spring having a pair of end portions which are inerted into the spring retainer openings in the rear wall of the reflector.

2. The light assembly of claim 1 in which the integral reflector is formed from deep drawn aluminum.

3. The light assembly of claim 1 including an electrical terminal attached to the rear wall of the reflector.

4. The light assembly of claim 1 in which the retainer spring is formed from a wire which has a pair of L-shaped end portions and a looped central portion, each of the end portions being inserted into one of the spring retainer openings in the rear wall of the reflector and the looped central portion engaging the flange of the bulb assembly.

5. A light assembly comprising:

(a) an integral reflector having a generally parabolic reflecting wall with a front end and a rear end and a rear wall which extends generally perpendicularly to the axis of the reflecting wall, the rear wall having a bulb opening therein, (b) a bulb assembly comprising a light bulb and a generally flat flange attached to the light bulb, the light bulb extending through the bulb opening in the rear wall of the reflector and the flange engaging the rear wall of the reflector, and (c) a retainer spring mounted on the reflector and holding the flange of the bulb assembly against the rear wall of the reflector, said retainer spring being formed from a wire which has a pair of L-shaped end portions and a looped central portion, each of the end portions being inserted into an opening in the rear wall of the reflector and the looped central portion engaging the flange of the bulb assembly, one of said openings in the rear wall of the reflector is generally U-shaped and has a relatively long leg and a relatively short leg whereby an end of the retainer spring can be inserted through the long leg of the U-shaped opening and thereafter moved to the short leg of the U-shaped opening so that the spring is retained in the opening.

6. A light assembly comprising:

(a) an integral reflector having a generally parabolic reflecting wall with a front end and a rear end and a rear wall which extends generally perpendicularly to the axis of the reflecting wall, the rear wall having a bulb opening therein, said integral reflector including a generally cylindrical wall which extends rearwardly from the generally parabolic reflecting wall, said rear wall being positioned at the rear end of the cylindrical wall, (b) a bulb assembly comprising a light bulb and a generally flat flange attached to the light bulb, the light bulb extending through the bulb opening in the rear wall of the reflector and the flange engaging the rear wall of the reflector, and (c) a retainer spring mounted on the reflector and holding the flange of the bulb assembly against the rear wall of the reflector, said retainer spring being formed from a wire which has a pair of L-shaped end portions and a looped central portion, each of the end portions being inserted into an opening in the rear wall of the reflector and the looped central portion engaging the flange of the bulb assembly, one of said openings in the rear wall of the reflector is generally U-shaped and has a relatively long leg and a relatively short leg whereby an end of the retainer spring can be inserted through the long leg of the U-shaped opening and thereafter moved to the short leg of the U-shaped opening so that the spring is retained in the opening.

7. The light assembly of claim 1 in which the front end of the reflecting wall terminates in a rim having a radially outwardly extending annular wall and a forwardly extending generally cylindrical outer wall, an O-ring positioned within the rim against the annular wall, a lens positioned within the rim against the O-ring, and a retainer ring surrounding the rim and holding the lens against the O-ring.

8. The light assembly of claim 7 in which the retainer ring is formed from a pair of semicircular ring halves which are sonic welded together.

9. The light assembly of claim 7 in which the retainer ring is generally U-shaped in cross section and includes a rear wall which engages the annular wall of the rim, an outer wall which engages the outer wall of the rim, and a front wall which engages the lens.

* * * * *

UNITED STATES PATENT AND TRADEMARK OFFICE

CERTIFICATE OF CORRECTION

PATENT NO. : 4,612,609

DATED : September 16, 1986

INVENTOR(S) : William J. Collins

It is certified that error appears in the above-identified patent and that said Letters Patent is hereby corrected as shown below:

Col. 4, line 34 change "inerted" to --inserted--

Signed and Sealed this

Eleventh Day of November, 1986

*Attest:*

DONALD J. QUIGG

*Attesting Officer* *Commissioner of Patents and Trademarks*